United States Patent

Weirauch

(10) Patent No.: US 6,910,115 B2
(45) Date of Patent: Jun. 21, 2005

(54) SYSTEM AND METHOD FOR CONFIGURING A REMOVABLE STORAGE MEDIUM

(75) Inventor: Charles Robert Weirauch, Loveland, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 631 days.

(21) Appl. No.: 10/001,468

(22) Filed: Oct. 31, 2001

(65) Prior Publication Data

US 2003/0084262 A1 May 1, 2003

(51) Int. Cl.[7] .............................................. G06F 13/00
(52) U.S. Cl. ........................ 711/170; 711/154; 711/163
(58) Field of Search ................................ 711/170, 154, 711/163

(56) References Cited

U.S. PATENT DOCUMENTS

| | | | | |
|---|---|---|---|---|
| 5,991,862 A | | 11/1999 | Ruane | ........................ 711/202 |
| 6,279,089 B1 | * | 8/2001 | Schibilla et al. | ............ 711/162 |
| 6,381,693 B2 | * | 4/2002 | Fish et al. | ...................... 713/1 |
| 6,401,201 B2 | * | 6/2002 | Fish et al. | ...................... 713/2 |
| 6,606,285 B1 | * | 8/2003 | Ijtsma et al. | ............... 369/47.1 |
| 6,671,249 B2 | * | 12/2003 | Horie | ...................... 369/275.3 |
| 6,760,288 B2 | * | 7/2004 | Ijtsma et al. | ............. 369/53.18 |
| 2001/0042242 A1 | * | 11/2001 | Fish et al. | ...................... 717/6 |
| 2001/0042243 A1 | * | 11/2001 | Fish et al. | ...................... 717/6 |
| 2002/0064111 A1 | * | 5/2002 | Horie | ...................... 369/47.54 |
| 2003/0061384 A1 | * | 3/2003 | Nakatani | ..................... 709/245 |
| 2003/0068159 A1 | * | 4/2003 | De Haan | ..................... 386/95 |
| 2003/0210627 A1 | * | 11/2003 | Ijtsma et al. | ............. 369/53.18 |

* cited by examiner

*Primary Examiner*—Reba I. Elmore

(57) ABSTRACT

System and method for configuring a removable storage medium. An embodiment of the invention may comprise selecting a configuration for the removable storage medium, wherein logical sectors are consistently identified for both an aware device and an unaware device. If the selected configuration is for the aware device, then a standard location for a file system indicator may be masked on the removable storage medium. If the selected configuration is for the unaware device, then the file system indicator may be copied from a non-standard location to the standard location on the removable storage medium.

20 Claims, 7 Drawing Sheets

SYSTEM AND METHOD FOR CONFIGURING A REMOVABLE STORAGE MEDIUM

FIELD OF THE INVENTION

The invention generally pertains to removable storage media, and more specifically, to system and method for configuring removable storage media for various devices.

BACKGROUND OF THE INVENTION

Digital information, including computer-readable program code, text, and multimedia (e.g., graphics, audio, video), to name a few, continues to proliferate. Therefore, storage media, and devices for recording and reading the storage media, are continually being developed and enhanced for storing and accessing digital information.

Digital information is typically organized on removable storage media in the form of sectors. A removable storage medium may comprise a number of physical sectors, at least a portion of which may be further represented as logical sectors. Digital information is organized on the logical sectors of the removable storage media according to a file system (e.g., International Organization for Standardization's ISO 9660 file structure standard, Universal Disk Format (UDF), variations thereof, etc.). Typically, a file system indicator (e.g., an anchor volume descriptor pointer (AVDP) for a UDF file system) is written at a standard location on the removable storage medium and indicates additional file system information for the removable storage medium. By way of example, when the removable storage medium is loaded into a device for reading the digital information stored thereon, the device detects the file system indicator (e.g., the UDF AVDP) at the standard location (e.g., for DVD, physical sector number (PSN) "30100", logical sector number (LSN) "256") on the removable storage medium, which indicates additional file system information. The device may then use software and/or firmware to access the digital information according to the file system.

Information on read-only storage media, such as DVD-ROM (read-only-memory) discs, is initially recorded using a standard file system (e.g., UDF). Most appliances (e.g., DVD players) and computer drives (e.g., DVD drives) readily recognize the standard file system. Digital information on a read-only storage medium cannot be modified. As such, the use of read-only removable storage media is limited to digital information that does not require modification. For example, read-only removable storage media may be used for distribution of video recordings, software applications, and data, to name a few.

Rewritable storage media, such as DVD+RW (rewritable) discs, on the other hand, are formatted to read, write or record, and modify (e.g., rewrite, erase, etc.) digital information thereon. Digital information may be read, recorded, and modified on the rewritable storage media using suitable software and/or firmware. The software and/or firmware may also allow the media to be configured for defect management. That is, when an area on the media is damaged or worn from repeated use, the digital information for that area may instead be written to another area on the removable storage media and the media may be "remapped" (e.g., reassigning the logical sectors to different physical sectors). This causes some digital information intended to occur in consecutive physical sectors to be recorded in non-consecutive sectors even though it still appears as consecutive logical sectors to the file system.

Accordingly, a device that is "unaware" of the disc configuration may have difficulty reading a removable storage medium that has been remapped by a device that is "aware" of the disc configuration. That is, some types of data require physically consecutive sectors on the storage medium (e.g., video data). However, digital information may not be stored on consecutive sectors where the removable storage medium has been remapped for defect management. In addition, unaware devices typically are not readily upgraded with software or firmware for reading removable storage media that has been remapped. As such, the unaware device may be unable to read, or may misread, the correct digital information from the removable storage medium so configured.

SUMMARY OF THE INVENTION

System for configuring a removable storage medium for a aware device and an unaware device. An embodiment of the system may comprise computer-readable program code stored on computer-readable storage media. The computer-readable program code may comprise program code for masking at least one standard location for a file system indicator on the removable storage medium, whereby the removable storage medium is configured for access by an aware device. The computer readable program code may also comprise program code for copying the file system indicator from at least one non-standard location to the at least one standard location on the removable storage medium, whereby the removable storage medium is configured for access by an unaware device.

Method for configuring a removable storage medium is also disclosed and may comprise the steps of: selecting a configuration for the removable storage medium, wherein logical sectors are consistently identified for both an aware device and an unaware device, if the selected configuration is for the aware device, then a standard location of a file system indicator may be masked on the removable storage medium, and if the selected configuration is for the unaware device, then the file system indicator may be copied from a non-standard location to the standard location on the removable storage medium.

BRIEF DESCRIPTION OF THE DRAWINGS

Illustrative and presently preferred embodiments of the invention are illustrated in the drawings, in which.

DESCRIPTION OF THE PREFERRED EMBODIMENT

Figure 1:
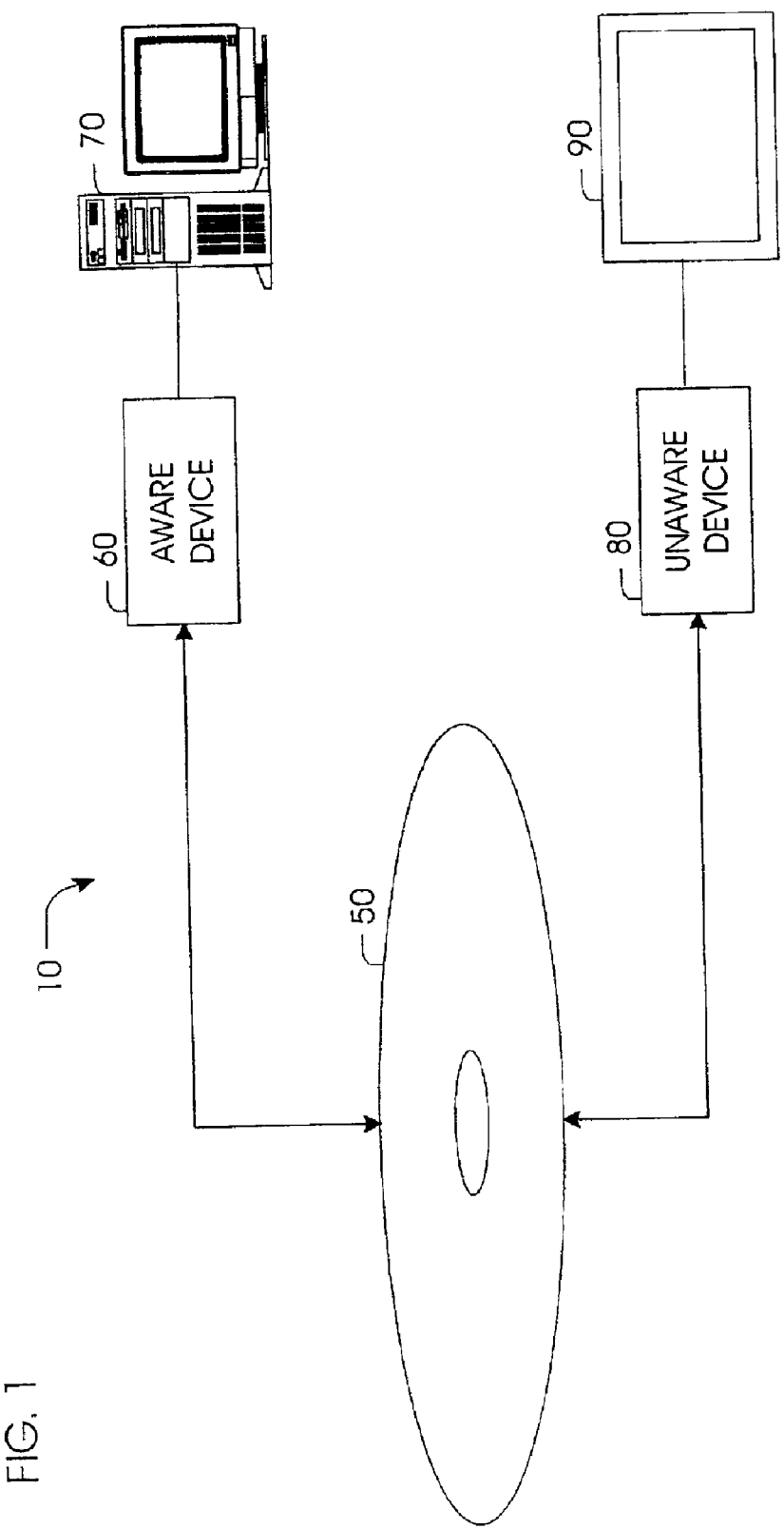
FIG. 1 is a high-level diagram illustrating an embodiment of a removable storage medium that may be interchangeably configured for an aware device and an unaware device according to the teachings of the invention.

System 10 for interchangeably configuring a removable storage medium 50 for an aware device 60 and an unaware device 80 is shown and described herein as it could be used to access and modify digital information on a DVD+RW disc (e.g., 50). According to the teachings of the invention, digital information recorded on the removable storage medium 50 may be read from the removable storage medium 50 with an aware device 60 (e.g., a DVD+RW computer drive) or an unaware device 80 (e.g., a DVD video player), regardless of whether it has been managed for defects.

Briefly, the digital information may be organized in a user data area 120 (e.g., FIG. 2) of the removable storage medium 50 according to a file system, such as, ISO 9660, UDF, variations thereof, etc. A file system indicator 350 (FIG. 3) stored on the removable storage medium 50 (e.g., in sector 140) may indicate additional file system information that is used to organize the digital information in the user data area 120. When the aware device 60 or the unaware device 80 detects the file system indicator 350 on the removable storage medium 50, software and/or firmware is used to access the digital information stored thereon according to the additional file system information pointed to by the file system indicator 350.

The digital information recorded on the removable storage medium 50 may comprise video and/or other data. Generally, video may be recorded on defective sectors of the removable storage medium 50, which typically is not noticeable, or may appear as a "skip" or "glitch" when the video is viewed. However, data recorded on a defective sector may be inaccessible, and may therefore corrupt entire files. Therefore, it is generally unacceptable to record data on defective sectors of the removable storage medium 50. As such, the removable storage medium 50 may be managed for defects.

The aware device 60 may manage the removable storage medium 50 for defects by writing the digital information recorded on a defective or corrupt sector to another sector on the removable storage medium 50, and by remapping the removable storage medium 50 accordingly. However, the unaware device 80 may not recognize the removable storage medium 50 managed for defects. That is, the unaware device 80 may be unable to read, or may inaccurately read, the digital information from the removable storage medium 50.

Both aware devices 60 and unaware devices 80 are both widely available on the market today, and many users may even have one or more of each type of device. Therefore, a user may desire to interchangeably configure the removable storage medium 50 for both the aware device 60 and the unaware device 80.

Figure 3:
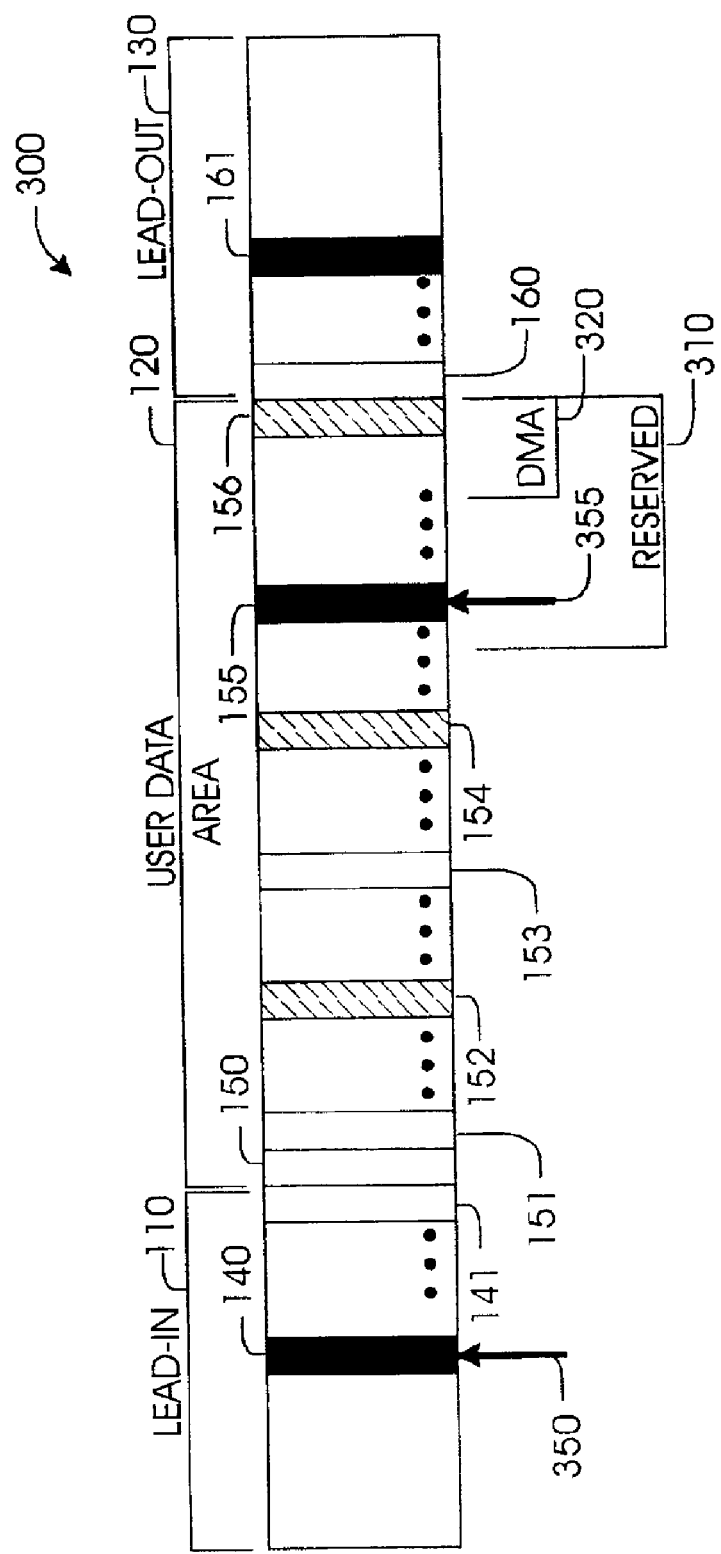
FIG. 3 illustrates the layout of an embodiment of the removable storage medium configured for an aware device according to the teachings of the invention.
Figure 4:
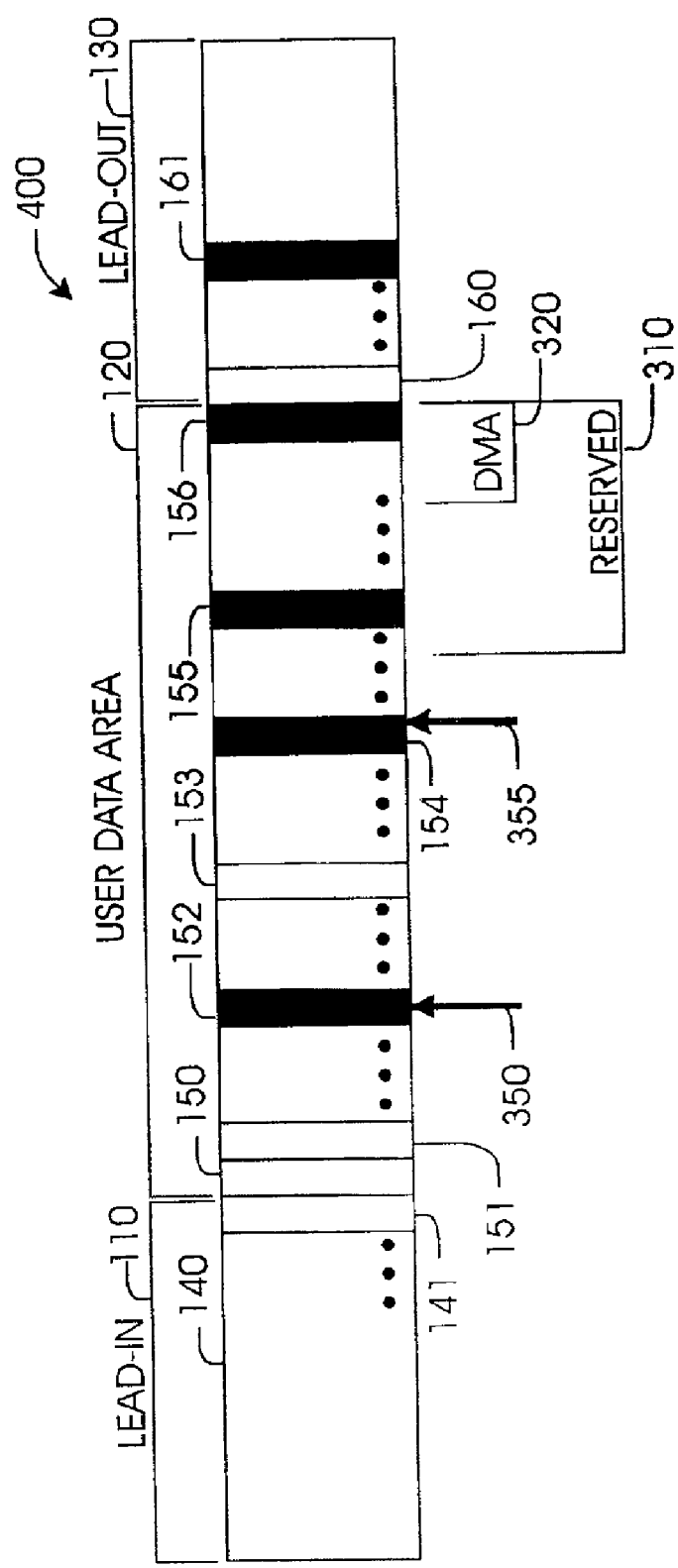
FIG. 4 illustrates the layout of an embodiment of the removable storage medium configured for an unaware device according to the teachings of the invention.

According to the teachings of the invention, embodiments of system 10 for interchangeably configuring a removable storage medium 50 for an aware device 60 and an unaware device 80 may comprise computer-readable program code (e.g., software and/or firmware) stored on computer-readable storage media. The computer-readable program code may comprise program code for masking a standard location 152 for a file system indicator 350 on the removable storage medium 50. When the standard location 152 for the file system indicator 350 is masked (e.g., as shown in FIG. 3), the removable storage medium 50 is configured for access by the aware device 60 by writing the file system indicator 350 at a non-standard location. Although the file system indicator 350 is written at a non-standard location, the aware device recognizes the file system indicator 350, and may thus access the removable storage medium 50, preferably according to a standard file system. However, when the removable storage medium 50 is placed in the unaware device 80, the unaware device 80 searches for the file system indicator 350 at the standard location 152, but does not detect the file system indicator 350 (i.e., the standard location 152 is masked). As such, the unaware device 80 does not recognize the removable storage medium 50 and therefore does not attempt to read the digital information recorded thereon, avoiding the risk of inaccurately reading it. The computer-readable program code may also comprise program code for copying the file system indicator 350 to the standard location 152 on the removable storage medium 50 (e.g., as shown in FIG. 4). As such, the unaware device 80 may detect the file system indicator 350 in the standard location 152, and thus the removable storage medium 50 is configured for access by the unaware device 80.

The system 10 may be operated as follows for interchangeably configuring a removable storage medium 50 for an aware device 60 and an unaware device 80. A configuration for the removable storage medium 50 may be selected, wherein logical sectors (e.g., 150, 151, etc. in FIG. 2) are consistently identified for both the aware device 60 and the unaware device 80. If the selected configuration is for the aware device 60, then a standard location 152 for a file system indicator 350 may be masked (e.g., as shown in FIG. 3) on the removable storage medium 50. If the selected configuration is for the unaware device 80, then the file system indicator 350 may be copied from a non-standard location (e.g., 161) to the standard location 152 on the removable storage medium 50 (e.g., as shown in FIG. 4).

According to embodiments of the invention, the removable storage medium 50 may be organized according to the basic constructs of a single file system for access by both aware devices 60 and unaware devices 80. That is, the file system descriptors remain valid, and only the initial pointer or file system indicator 350 (e.g., the AVDP for a UDF file system) changes. Thus, the removable storage medium 50 may be managed for defects using the aware device 60, and converted for an unaware device that may not be readily upgraded for reading a removable storage medium 50 that is managed for defects. In addition, the unaware device 130 may be blocked from reading the removable storage medium 50 when it is configured for the aware device 60, so as to avoid inaccurately reading the digital information stored thereon. Furthermore, the removable storage medium 50 preferably may be configured for any type of information (e.g., data, audio, video, etc.) and for any combination thereof. For example, the removable storage medium 50 may be configured for video only, for data only, or for both video and data.

Having generally described system 10 and methods for interchangeably configuring a removable storage medium 50 for an aware device 60 and an unaware device 80, embodiments of system and methods of the invention will now be described in further detail.

FIG. 1 illustrates a removable storage medium 50 that may be interchangeably configured for an aware device 60 and an unaware device 80. In one embodiment, for example, the removable storage medium 50 may be a DVD disc for storing digital information (e.g., digital photographs, graphics, text files, software applications, etc.) thereon. The user may read, write, or modify the digital information thereon via a PC 70 using the aware device 60 (e.g., a computer DVD+RW drive). Likewise, the user may read the digital information on the DVD disc (e.g., view video recorded thereon) with a television 90 using the unaware device 80 (e.g., a DVD player).

Both aware devices 60 and unaware devices 80 are widely available. Indeed, many users may even have one or more of each type of device, such as a DVD+RW drive for the PC 70, and a DVD player 80 for the television 90. Therefore, system 10 interchangeably configures the removable storage medium 50 for use with both the aware device 60 and the unaware device 80, as discussed in more detail below.

Before continuing, it should be understood that the term "aware" as used with reference to the aware device 60, is intended to encompass any device or devices that have software and/or firmware operatively associated therewith for accessing digital information on the removable storage medium 50 when it is configured to be accessed by the aware device 60 (e.g., configured for defect management). The term "unaware" as used with reference to the unaware device 80, is intended to encompass any device or devices that do not have the requisite software and/or firmware operatively associated therewith for accessing digital information on the removable storage medium 50 when it is configured to be accessed by the aware device 60. For example, the aware device may be a DVD+RW drive, a DVD-ROM drive, etc., as long as the requisite software and/or firmware is operatively associated therewith. Also for example, the unaware device 80 may also be a DVD+RW drive, a DVD-ROM drive, etc., when the requisite software and/or firmware is not operatively associated therewith.

It is understood that although the invention is described herein as it may be practiced using a DVD disc, the scope of the invention is not limited thereto, and any suitable removable storage medium 50, now known or later developed, may be used according to the teachings of the invention. For example, the removable storage medium 50 may comprise an optical storage medium, a removable hard disk drive, other removable magnetic media, etc. It is also understood that, although the invention is described herein as it may be practiced using a UDF file system and an AVDP file system indicator, any suitable file system, and the indicator 350 therefor, may be used according to the teachings of the invention. It is further understood that the PC 70 and the television 90 are merely illustrative of devices for use with the aware device 60 and the unaware device 80, and that other devices (not shown) may be used therewith.

Figure 2:
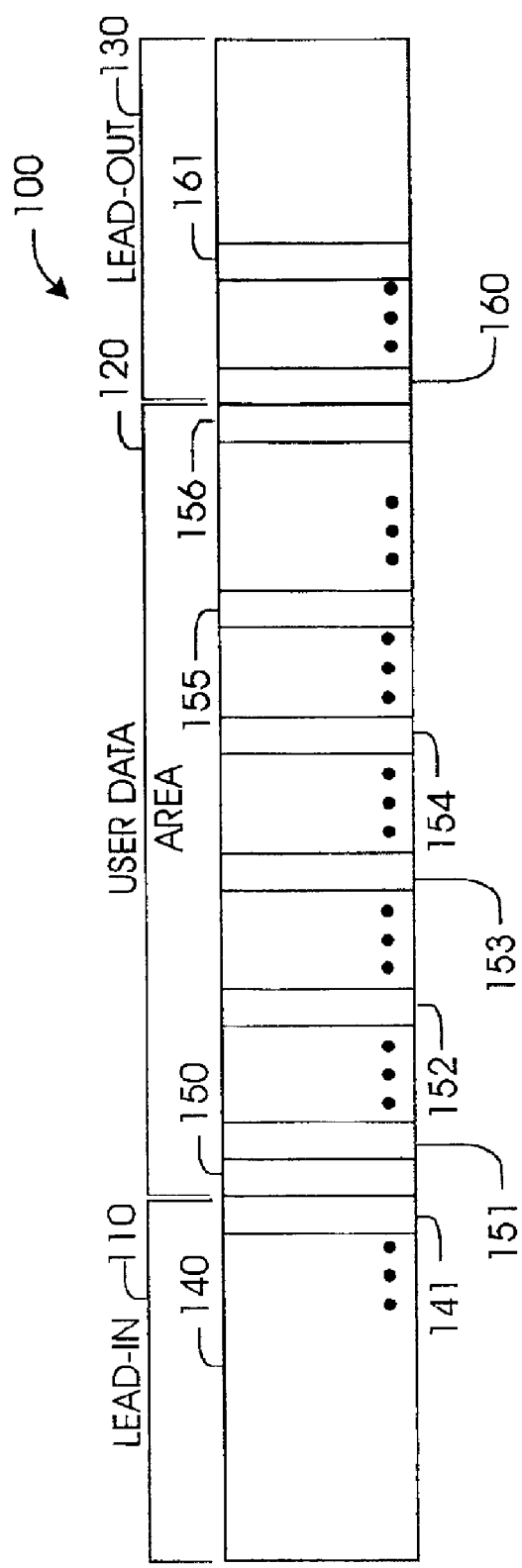
FIG. 2 illustrates the layout of an embodiment of the removable storage medium.

FIG. 2 illustrates the layout 100 of an embodiment of the removable storage medium 50. Generally, the removable storage medium 50 may comprise a number of (i.e., one or more) physical sectors (e.g., 140, 150, and 160, and others). The physical sectors 140, 150, 160 may be organized into a lead-in area 110, a user data area 120, and a lead-out area 130. The lead-in area 110 may comprise a number of physical sectors 140, 141. The physical sectors 140, 141 in the lead-in area 110 are typically accessible by the aware device 60, but are typically inaccessible by the unaware device 80. Likewise, the lead-out area 130 may comprise a number of physical sectors 160, 161. The physical sectors 160, 161 in the lead-out area 130 are also typically accessible by the aware device 60, but are typically inaccessible by the unaware device 80. The user data area 120 may also comprise a number of physical sectors 150–156. The user data area 120 is typically accessible by both the aware device 60 and the unaware device 80, and is where digital information may be recorded, modified and read. The physical sectors 150–156 of the user data area 120 are preferably organized as logical sectors.

In use, the digital information is preferably organized on the logical sectors of the removable storage medium 50 according to a standard file system, such as, ISO 9660,UDF, etc. A file system indicator 350 (FIG. 3) preferably indicates the additional file system information used to organize the digital information on the logical sectors. When the aware device 60 or the unaware device 80 detects a file system indicator 350 at a standard sector or location 152 (e.g., PSN "30100", LSN "256" for a UDF file system) on the removable storage medium 50, software and/or firmware may be used to access the digital information stored thereon according to the additional file system information pointed to by the file system indicator 350.

It is understood that the removable storage medium 50 may be organized in any suitable format, and that the layout shown and described with respect to FIG. 2 is merely illustrative of a layout for a removable storage medium 50, such as a DVD disc. In addition, it is understood that the lead-in area 110, the user data area 120, and the lead-out area 130 may comprise any number of physical sectors. Likewise, the user data area 120 may comprise any number of logical sectors. However, according to a preferred embodiment of the invention, the logical sectors are consistently identified whether the storage medium 50 is configured for use with an aware device 60 or an unaware device 80. For example, the first physical sector 150 of the user data area 120 (PSN "30000") is identified as LSN "0",the second physical sector 151 of the user data area 120 (PSN "30001") is identified as LSN "1", and so forth, and the identification of the logical sectors is consistent when the storage medium 50 is configured for use with the aware device 60 and when it is configured for use with the unaware device 80. As such, the unaware device 80 recognizes the digital information recorded in the user data area 120 according to a standard file system, and the digital information need not be re-recorded thereon to interchangeably configure the removable storage medium 50.

Preferably, the removable storage medium 50 is initialized for the aware device 60 as illustrated with respect to FIG. 3. The layout 300 of the removable storage medium 50 is similar to that shown in FIG. 2, however it is initialized for the aware device 60. During initialization, a standard location (e.g., sector 152) for the file system indicator 350 is masked, as illustrated by the crosshatch pattern in FIG. 3. For example, zeros are written to the sector 152. Likewise, when there are copies 355 of the file system indicator (e.g., AVDP for a UDF file system), the standard locations (e.g., sectors 154 and 156) for these backup file system indicators 355 are also masked, again as illustrated by the crosshatch pattern in FIG. 3. Also during initialization, the file system indicator 350 is instead written at a non-standard location (e.g., sector 140), as illustrated by the solid pattern in FIG. 3. Likewise, the backup file system indicator(s) 355, if any, may also be written to other non-standard locations (e.g., sectors 155 and 161).

As such, when the removable storage medium 50 is placed in an aware device 60, the aware device 60 detects the file system indicator 350 at the non-standard location 140, which indicates the additional file system information for accessing the digital information stored in the user data area 120. However, when the removable storage medium 50 is placed in an unaware device 80, the unaware device 80 searches the standard location 152 for the file system indicator 350, and any standard location(s) 154, 156 for backup file system indicators 355, if any. As the standard location(s) 152, 154, 156 are masked, the unaware device 80 does not detect the file system indicator 350. Thus, the unaware device 80 is unable to read the digital information recorded on the removable storage medium 50, avoiding inaccurately reading the digital information, for example, where the removable storage medium 50 has been managed for defects.

It is understood that the standard location 152 for the file system indicator 350, and the standard location(s) 154, 156 for backup file system indicator(s) 355, if any, may be any suitable sector(s) in the user data area 120 of the removable storage medium 50. Preferably, the standard location(s) 152, 154, 156 are defined by the specification for the file system. For example, for a UDF file system, the standard location 152 for the file system indicator 350 is PSN "30100", LSN "256".

It is also understood that the non-standard location 140 for the file system indicator 350, and the non-standard location (s) 155, 161 for backup file system indicator(s) 355, if any, may be any suitable sector(s) on the removable storage medium 50 other than the sector(s) conventionally accessed as standard location(s) 152, 154, 156 on the removable storage medium 50 for detecting the file system indicator(s) 350, 355. For example, the non-standard location(s) 140, 155, 161 may be sector(s) 150–156 in the user data area. Preferably, when the non-standard location(s) 140, 155, 161 are sectors in the user data area 120, the non-standard location(s) 140, 155, 161 are reserved sector(s) 310. Also for example, as the physical sectors 140, 141 in the lead-in area 110, and the physical sectors 160, 161 of the lead-out area 130, are typically accessible by the aware device 60, the non-standard location(s) 140, 155, 161 may be sector(s) in the lead-in area 110 and/or sector(s) in the lead-out area 130.

In use, the digital information is organized on the logical sectors of the user data area 120 according to the constructs of a standard file system, such as, ISO 9660,UDF, etc. Thus preferably, initializing the removable storage medium 50 may comprise configuring the user data area 120 with consecutively identified logical sectors. For example, the first physical sector 150 of the user data area 120 (PSN "30000") is identified as LSN "0",the second physical sector 151 of the user data area 120 (PSN "30001") is identified as LSN "1",and so forth. Such organization allows the digital information to be recognized by the unaware device 80 according to a standard file system (e.g., UDF) without having to be re-recorded when the removable storage medium 50 is reconfigured for the unaware device.

Also preferably, initializing the removable storage medium 50 may comprise reserving sectors (e.g., reserved area 310) in the user data area 120. The reserved sectors 310 are inaccessible as recordable sectors by the user, and may not be read by the unaware device 80. However, the reserved sectors 310 may be used by the software and/or firmware for the aware device 60. For example, one or more of the reserved sectors 310 may be used as a non-standard location for the file system indicator 350 or the backup file system indicator 355 (e.g., sector 155 in FIG. 3). Also for example, a number of the reserved sectors 310 may be reserved as a defect management area (DMA) 320. That is, the DMA 320 may be used as replacement sectors for defective sectors. It is understood that the DMA 320 may also comprise sectors in the lead-in area 110 and/or in the lead-out area 130.

Once initialized, digital information may be recorded, modified, and read from the removable storage medium 50 using the aware device 60. In addition, the aware device 60 may manage the removable storage medium 50 for defects. That is, when a sector in the user data area 120 is defective (i.e., digital information is no longer reliably read therefrom), the digital information is written to another sector, preferably within the DMA 320 of the user data area 120. Preferably, a defect management table (not shown) is written to one of the sectors (e.g., 141) for remapping the defective sectors to replacement sectors 320. As an illustration, when sector 151 is determined to be defective, the digital information on sector 151 may be written to reserved sector 156. Thus, when the digital information originally written to sector 151 is accessed (e.g., by the user at PC 70), the aware device 60 instead accesses the digital information from reserved sector 156, according to the defect management table.

Preferably, the digital information is organized on the removable storage medium 50 by the aware device 60 according to the basic constructs of a standard file system (e.g., UDF). As such, the file system descriptors remain valid, and only the initial pointer or file system indicator 350 for the file system (e.g., the AVDP for a UDF file system) changes when the removable storage medium 50 is converted for the unaware device 80. That is, the removable storage medium 50 may be converted for the unaware device 80 by copying the file system indicator 350 to the standard location 152 on the removable storage medium 50, as explained in more detail below with respect to FIG. 4.

FIG. 4 illustrates the layout 400 of an embodiment of the removable storage medium 50, as shown in FIG. 2 and FIG. 3, configured for an unaware device 80. That is, the file system indicator 350, and any backup file system indicator (s) 355, is copied from the non-standard location(s) 140, 155, 161 to the standard location(s) 152, 154, 156, and the standard location(s) 152, 154, 156 are no longer masked, as indicated by the solid-fill pattern in FIG. 4. As the user data area 120 is configured with consecutively identified logical sectors, and the digital information is organized on the logical sectors of the user data area 120 according to the constructs of a standard file system, the unaware device 80 may access the digital information stored in the user data area 120 thereof.

As the unaware device 80 may be unable to access digital information that is remapped for defect management, the remapped digital information is preferably copied (e.g., from the DMA 320) to the original sector(s) in the user data area 120, as indicated by the file system. The digital information that has been rewritten on the defective sectors may be inaccessible, or may be unreliably accessed by the unaware device 80. However, and by way of example, where the removable storage medium 50 contains video, and the unaware device 80 is a DVD player, the defective sector may cause a "skip" or "glitch" in the video, which is generally acceptable. Where the defective sector contains data, the data is preferably copied from the DMA 320, and not moved therefrom. Thus, the removable storage medium 50 may be converted again for access by the aware device 60, and the data may be once again accessed from the DMA 320 using the software and/or firmware for defect management.

The removable storage medium 50 configured for the unaware device 80 (as shown in FIG. 4) may also be converted for the aware device 60 (as shown in FIG. 3) so that the unaware device 80 does not recognize it. Preferably, when the removable storage medium 50 is returned to the aware device 60, the software and/or firmware automatically recognizes that it is configured for the unaware device 80, and may configure it for the aware device 60. For example, the software and/or firmware may detect the file system indicator 350 at the standard location 152. Thus, the software and/or firmware masks the standard location(s) 152, 154, 156 for the file system indicator 350 and any backup file system indicators 355, so that the removable storage medium 50 is inaccessible by the unaware device 80. As such, the unaware device 80 cannot be used to read, and potentially misread, the digital information on the removable storage medium 50 (e.g., where it is managed for defects).

It is understood that the removable storage medium 50 may be interchangeably configured for both the aware device 60 and the unaware device 80. Optionally, when the removable storage medium 50 is configured for the aware device 60, the file system indicator 350, and any backup file system indicators 355, may be copied from the standard location(s) 152, 154, 156 to the non-standard location(s) 140, 155, 161. Also optionally, when the removable storage medium 50 is configured for the aware device 60, the non-standard location(s) 140, 155, and 161 may be masked. Although the unaware device 80 may not modify the digital information on the removable storage medium 50, and/or the unaware device 80 may not read the lead-in area 110, the lead-out area 130, and the reserved area 310, these steps may be used a precautionary measure. For example, one or more of these steps may be taken where the file system may be modified, or where the file system indicator 350 may be recognized in one or more of the non-standard locations by another device.

Figure 5:
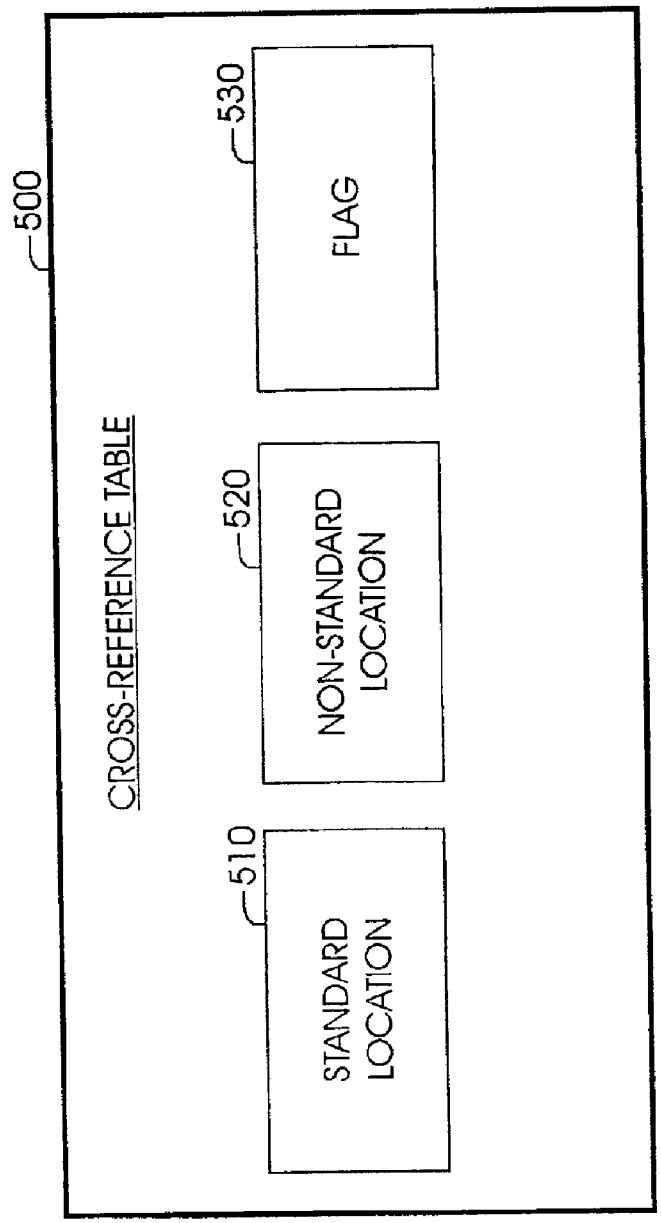
FIG. 5 illustrates an exemplary cross-reference table for interchangeably configuring the removable storage medium for an aware device and an unaware device according to the teachings of the invention.

FIG. 5 illustrates an exemplary cross-reference table 500 for interchangeably configuring the removable storage medium 50 for the aware device 60 and the unaware device 80. The cross-reference table 500 is preferably generated during initialization of the removable storage medium 50, and may be written to a physical sector of the removable storage medium 50 (e.g., sector 141 in the lead-in area 110). The cross-reference table 500 may comprise a number of fields, such as, a field 510 for the standard location 152 of the file system indicator 350, and a field 520 for the associated non-standard location 140. As such, the firmware and/or software for the aware device 60 may readily determine the relationship between the standard location 152 and the non-standard location 140 for the file system indicator 350 on the removable storage medium 50. In a preferred embodiment, the cross-reference table 500 also comprises a field 530 for indicating the configuration of the removable storage medium 50. Preferably, the field 530 is updated when the removable storage medium 50 is initialized and each time it is interchangeably configured.

Table 1 and Table 2 illustrate exemplary values that may be stored in each of the fields 510, 520, 530 of the cross-reference table 500.

TABLE 1

| STANDARD LOCATION | NON-STANDARD LOCATION | FLAG |
|---|---|---|
| Physical Sector (152) | Physical Sector (140) | 00 |
| Physical Sector (154) | Physical Sector (155) | 00 |
| Physical Sector (156) | Physical Sector (161) | 00 |

In Table 1, the standard locations 152, 154, and 156 for the file system indicator 350 and backup file system indicators 355 are shown corresponding to the non-standard locations 140, 155, 161 therefor. In addition, the flag values are set to "zero", thus indicating that the removable storage medium 50 is configured for the aware device 60 (e.g., as illustrated in FIG. 3). That is, the file system indicator(s) 350, 355 are each written to the respective non-standard location(s) 140, 155, 161.

TABLE 2

| STANDARD LOCATION | NON-STANDARD LOCATION | FLAG |
|---|---|---|
| Physical Sector (152) | Physical Sector (140) | 01 |
| Physical Sector (154) | Physical Sector (155) | 01 |
| Physical Sector (156) | Physical Sector (161) | 01 |

In Table 2, the standard locations 152, 154, and 156 for the file system indicator 350 and backup file system indicators 355 are also shown corresponding to the non-standard locations 140, 155, 161 therefor. However, the flag values are set to "one", thus indicating that the removable storage medium 50 is configured for the unaware device 80 (e.g., as illustrated in FIG. 4). That is, the file system indicator(s) 350, 355 are each written to the respective standard location(s) 152, 154, 156.

It is understood that the cross-reference table 500 shown and described with respect to FIG. 5 is merely exemplary of a cross-reference table that may be used according to one embodiment. Other embodiments are also contemplated as being within the scope of the invention.

Figure 6:
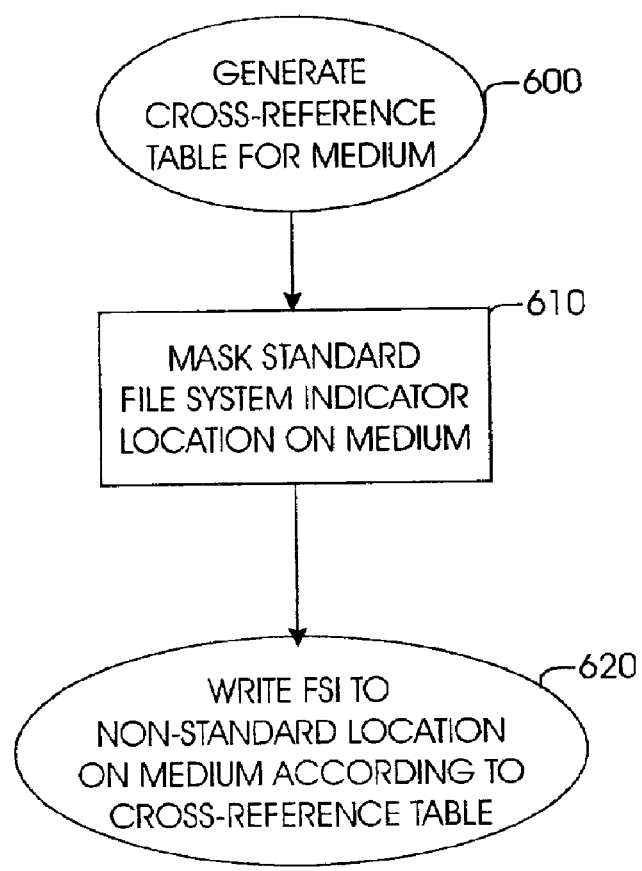
FIG. 6 is a flow chart illustrating an embodiment for initializing a removable storage medium to be interchangeably configured for an aware device and an unaware device according to the teachings of the invention.

FIG. 6 is a flow chart illustrating an embodiment for initializing a removable storage medium 50 to be interchangeably configured for an aware device 60 and an unaware device 80. In step 600, a cross-reference table 500 may be generated for the removable storage medium 50, such as the exemplary cross-reference table 500 discussed above with respect to FIG. 5. In step 610, the standard location 152 for the file system indicator 350 on the removable storage medium 50 may be masked. For example, zeros may be written to the sector 152. In step 620, the file system indicator 350 is written to a non-standard location 140 on the removable storage medium 50, preferably according to the cross-reference table 500 generated in step 600. Once initialized, the removable storage medium 50 may be interchangeably configured for the aware device 60 and the unaware device 80.

As an illustration of initializing the removable storage medium 50, a cross-reference table 500 may be generated with a physical link between the user data area 120 and the non-user area (e.g., lead-in area 110). For example, for a UDF file system, the cross-reference table 500 may be written at sector "2F000h" and have values as shown in Table 3.

TABLE 3

| NON-STANDARD LOCATION (PSN - hexadecimal) | STANDARD LOCATION (PSN - hexadecimal) | FLAG |
|---|---|---|
| 2F001h | 30100h | 01 |
| 16053Fh | 160600h | 01 |

Where "30000h" is the beginning (or first physical sector) of the user data area 120 and "16053Fh" is the end (or last physical sector) of the user data area 120. In addition, the flag value "01" indicates that the file system indicator at the standard location is masked or obscured.

As such, when the file system requests the aware device 60 to write the file system indicator 350 (e.g., AVDP) to the standard location 152 (PSN "30100"), the aware device 60 instead writes the file system indicator 350 at the non-standard location 140 (PSN "2F001h"), and masks the standard location by writing "00" at PSN "30100h". Likewise, then the file system requests the aware device 60 to write the backup file system indicator 355 (e.g., a substantial copy of the AVDP) to another standard location 154 (PSN "13053Fh"), the aware device 60 instead writes the backup file system indicator 355 at another non-standard location 155 (PSN "160600h"), and masks the other standard location by writing "00" at PSN "16053Fh". At this point, the rewritable drive 60 can conventionally read and write digital information to the removable storage medium 50 according to the standard file system.

It is understood that the steps shown and described above with respect to FIG. 6 are merely illustrative of an embodiment of a method for initializing a removable storage medium 50 for interchangeably configuring the same for the aware device 60 and the unaware device 80. Other embodiments are also contemplated as being within the scope of the invention. These embodiments may comprise performing the steps simultaneously or in a different order than that shown in FIG. 6. For example, the order of the step of masking the standard file system indicator location (step 610) and the step of writing the file system indicator to a non-standard location (step 620) may be interchanged. Other embodiments may also comprise modifications to the steps shown in FIG. 6. For example, the step of generating a cross-reference table (step 600) may further comprise the step of writing the cross-reference table 500 to the storage medium. In another embodiment, for example, the cross-reference table 500 may be updated to indicate the configuration of the removable storage medium 50 during initialization thereof. Or for example, in yet another embodiment, initializing the removable storage medium 50 may also comprise reserving sectors (e.g., 155–156) for writing the file system indicator 350 (e.g., reserved area 310), and/or for defect management (e.g., defect management area 320).

Figure 7:
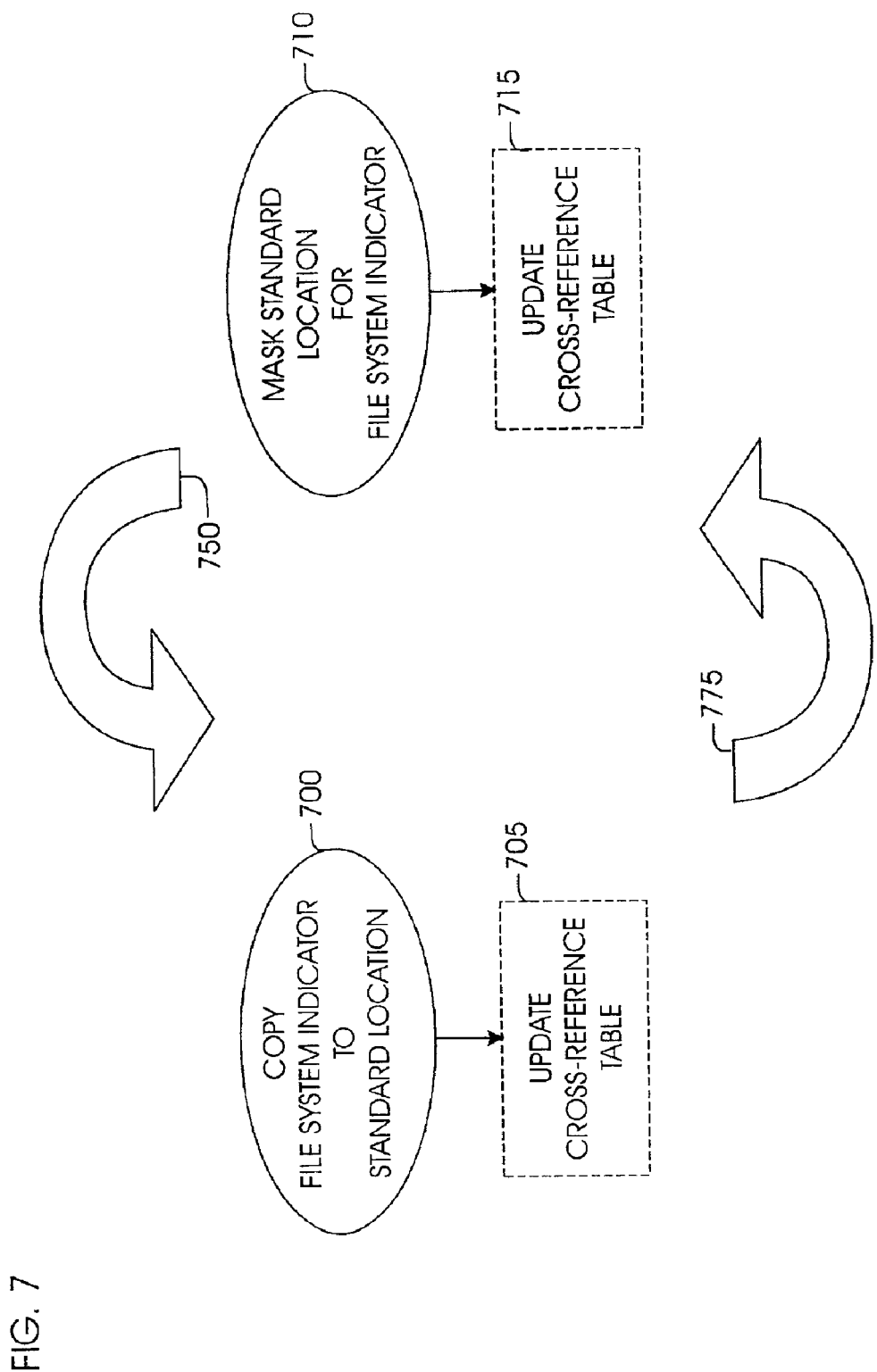
FIG. 7 is a flow chart illustrating an embodiment for interchangeably configuring a removable storage medium for an aware device and an unaware device according to the teachings of the invention.

FIG. 7 is a flow chart illustrating an embodiment for interchangeably configuring a removable storage medium 50 for a aware device and an unaware device 80. The removable storage medium 50 may be converted 750 for access to the consecutively identified logical sectors thereon by the unaware device 80. The conversion 750 may comprise copying the file system indicator 350 to the standard location 152 on the removable storage medium 50, as in step 700. Likewise, the removable storage medium 50 may be converted 775 for access to the consecutively identified logical sectors thereon by the aware device 60. The conversion 775 may comprise masking the standard location 152 for the file system indicator 350 on the removable storage medium 50, as in step 710.

In a preferred embodiment, converting 750 the removable storage medium 50 for the unaware device 80 may further comprise the step 705 of updating the cross-reference table 500, thus indicating the state of the removable storage medium 50 (i.e., that it is configured for the unaware device 80). Likewise, in a preferred embodiment, converting 775 the removable storage medium 50 for the aware device 60 may further comprise the step 715 of updating the cross-reference table 500, thus indicating the state of the removable storage medium 50 (i.e., that it is configured for the aware device 60).

As an illustration, and continuing with the example given above for initializing the removable storage medium 50, the removable storage medium 50 may be converted for the unaware device 80, as follows. The contents of PSN "2F001h" and PSN "160600h" are copied to PSN "30100h" and "16053Fh", respectively. Preferably, the cross-reference table 500 stored at PSN "2F00h" is also updated to indicate the state of the removable storage medium 50. For example, the flag values are set to "00" to indicate that file system indicators 350, 355 are written at the standard location therefor (i.e., PSN "30100h" and PSN "160600h", in this example). At this point, the removable storage medium 50 is readable by the unaware device 80.

As another illustration, and continuing with the examples given above for initializing the removable storage medium 50, and for converting it for the unaware device 80, the removable storage medium 50 may be converted for the aware device 60, as follows. The standard locations PSN "30100h" and PSN "16053Fh" for the file system indicators 350, 355 are masked (e.g., written with "00"). In addition, the flag values in the cross-reference table 500 stored at PSN "2F00h" are preferably updated to indicate the state of the removable storage medium 50. For example, the flag values are set to "01" to indicate that the file system indicators 350, 355 are written at the non-standard location therefor, and that the standard location is masked.

It is understood that the steps shown and described above with respect to FIG. 7 are merely illustrative of an embodiment of a method for interchangeably configuring a removable storage medium 50 for the aware device 60 and the unaware device 80. Other embodiments are also contemplated as being within the scope of the invention. For example, in another embodiment, the non-standard location (s) 140, 155, 161 for the file system indicator(s) 350, 355 may be masked when the removable storage medium 50 is configured for the unaware device 80. Also for example, in yet another embodiment, digital information written on replacement sectors according to defect management of the removable storage medium 50 may be copied to the original, "defective" sectors.

It should be noted that the teachings of the invention may be utilized with any of a wide range of removable storage media, file system, and devices for reading and/or writing digital information on the removable storage media, which are now known in the art or that may be developed in the future. It should also be noted that while embodiments of the invention are shown and described herein as it could be used for DVD discs using the UDF file system, with a conventional DVD computer drive and a conventional DVD video player, the removable storage medium 50, file system for organizing digital information thereon, the aware device 60, and the unaware device 80 are not limited to any particular type or style thereof. Consequently, the invention should not be regarded as limited to use with the DVD disc, the UDF file system, the DVD computer drive, and the DVD video player, shown and described herein.

What is claimed is:

1. A method for configuring a removable storage medium, comprising:

selecting a configuration for said removable storage medium, wherein logical sectors are consistently identified for both an aware device and an unaware device;

if the selected configuration is for said aware device, then masking a standard location for a file system indicator en said removable storage medium; and if the selected configuration is for said unaware device, then copying said file system indicator from a non-standard location to said standard location on said removable storage medium.

2. A method as in claim 1, further comprising initializing said removable storage medium, comprising:

masking said standard location for said file system indicator on said removable storage medium; and writing said file system indicator to said non-standard location on said removable storage medium.

3. A method as in claim 2, wherein initializing said removable storage medium further comprises reserving a number of logical sectors on said removable storage medium for defect management.

4. A method as in claim 2, wherein initializing said removable storage medium further comprises reserving at least one sector on said removable storage medium as said non-standard location for said file system indicator.

5. A method as in claim 1, further comprising indicating a state of said removable storage medium.

6. A method as in claim 1, wherein configuring said removable storage medium for said aware device further comprises masking a backup file system indicator on said removable storage medium.

7. A method as in claim 1, wherein configuring said removable storage medium for said unaware device further comprises copying a backup file system indicator to another standard location on said removable storage medium.

8. A system for configuring a removable storage medium with consistently identified logical sectors, comprising:
   computer-readable storage media;
   computer-readable program code stored on said computer-readable storage media, comprising:
      program code for masking at least one standard location for a file system indicator on said removable storage medium, whereby said removable storage medium is configured for access by an aware device; and
      program code for copying said file system indicator from at least one non-standard location to said at least one standard location on said removable storage medium, whereby said removable storage medium is configured for access by an unaware device.

9. A system as in claim 8, further comprising:
   program code for managing said removable storage medium for defects with said aware device, wherein digital information is copied from at least one defective sector to at least one replacement sector; and
   program code for copying said digital information from said at least one replacement sector to said at least one defective sector when said removable storage medium is configured for access by said unaware device.

10. A system as in claim 8, further comprising program code for copying said file system indicator from said at least one standard location to said at least one non-standard location when said removable storage medium is configured for access by said aware device.

11. A system as in claim 8, further comprising program code for masking said at least one non-standard location when said removable storage medium is configured for access by said unaware device.

12. A system as in claim 8, further comprising program code for initializing said removable storage medium to be interchangeably configured for access by said aware device and said unaware device.

13. A system as in claim 12, wherein said program code for initializing said removable storage medium comprises:
   program code for masking said at least one standard location for said file system indicator on said removable storage medium; and
   program code for writing said file system indicator to said at least one non-standard location on said removable storage medium.

14. A system as in claim 12, wherein said program code for initializing said removable storage medium comprises:
   program code for reserving a number of logical sectors on said removable storage medium for defect management.

15. A system as in claim 12, wherein said program code for initializing said removable storage medium comprises:
   program code for reserving at least one logical sector on said removable storage medium as said at least one non-standard location for said file system indicator.

16. A system as in claim 12, wherein said program code for initializing said removable storage medium comprises:
   program code for generating a cross-reference table for cross-referencing said at least one standard location to said at least one non-standard location.

17. A system as in claim 8, further comprising program code for indicating the state of said removable storage medium.

18. A system as in claim 8, further comprising program code for copying a backup file system indicator from another non-standard location to another standard location on said removable storage medium.

19. A system for configuring a removable storage medium, comprising:
   a first conversion module for configuring said removable storage medium for access by an aware device by masking a standard location for a file system indicator on said removable storage medium; and
   a second conversion module for configuring said removable storage medium for access by an unaware device by copying said file system indicator from a non-standard location to said standard location on said removable storage medium.

20. A system as in claim 19 further comprising an initialization module for masking a standard location for a file system indicator on said removable storage medium, and for writing said file system indicator to a non-standard location on said removable storage medium.

* * * * *